(12) United States Patent
Barker et al.

(10) Patent No.: US 6,424,878 B1
(45) Date of Patent: Jul. 23, 2002

(54) METHOD AND APPARATUS FOR IMPLEMENTING CUSTOM BUSINESS LOGIC

(75) Inventors: Brian C. Barker, Poughkeepsie; Perry G. Hartswick, Millbrook; Keith D. Newton, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/067,907

(22) Filed: Apr. 28, 1998

(51) Int. Cl.[7] .............................................. G06F 19/00

(52) U.S. Cl. ........................ 700/121; 700/97; 700/117

(58) Field of Search ................................ 700/121, 117, 700/97, 113, 96, 124, 95, 90, 99

(56) References Cited

U.S. PATENT DOCUMENTS

| | | | | |
|---|---|---|---|---|
| 5,089,970 A | * | 2/1992 | Lee et al. | 364/468 |
| 5,399,531 A | * | 3/1995 | Wu | 437/205 |
| 5,552,995 A | * | 9/1996 | Sebasstian | 364/468.03 |
| 5,777,876 A | * | 7/1998 | Beauchesne | 364/468.01 |
| 5,790,406 A | * | 8/1998 | Dunn et al. | 364/474.11 |

* cited by examiner

Primary Examiner—Peter Wong
Assistant Examiner—Tim Vo
(74) Attorney, Agent, or Firm—Ratner & Prestia; Jay H. Anderson, Esquire

(57) ABSTRACT

A manufacturing control system used in the manufacture of semiconductor products. The system has a custom business logic controller which can be used to define and implement custom business logic that departs from the conventional business logic associated with the several elements of the manufacturing control system both rapidly and in real time. The custom business logic controller is implemented by defining desired business logic within the definitional environment of the controller. Where custom business logic is required, the manufacturing control system operates to activate the custom business logic controller, which then proceeds to execute the desired (custom) series of business logic units. Within this series, the custom business logic controller can execute a continuous series of business logic units, or certain business logic units can be executed conditionally, based on the success or failure of a prior business logic unit or units, or based on some other environmental condition. As a result, any new logic can be easily implemented, without requiring any direct changes to be made to the existing (current) systems, and in such a way that there is no negative impact on production.

6 Claims, 6 Drawing Sheets

METHOD AND APPARATUS FOR IMPLEMENTING CUSTOM BUSINESS LOGIC

TECHNICAL FIELD

The present invention is generally directed to the manufacture of semiconductor products and, more particularly, to the systems which are used to control such manufacturing processes.

BACKGROUND OF THE INVENTION

The increased complexity of semiconductor products has led to a corresponding increase in the complexity of the processes which are used to manufacture such products. In this increasingly complex manufacturing environment, various distinct control systems must be used both to ensure product integrity and to allow production to proceed as efficiently as possible. In this environment, problems are often presented in which a control system solution is required as quickly as possible in order to enhance the level of protection to the integrity of the product or to increase the efficiency with which the product is manufactured.

FIG. 1 provides a schematic illustration of a conventional environment 1 for controlling the several processes associated with a theoretical manufacturing line. In this environment, the operator of the manufacturing line (i.e., the operating engineer) oversees each of a plurality of systems $2_1, 2_2, 2_3, \ldots, 2_n$ using the operator controls 3. It will be understood that the manufacturing line can comprise any number of, and any combination of, operating systems $2_1, 2_2, 2_3, \ldots, 2_n$ for performing a given manufacturing task. Regardless of the configuration being implemented, however, each of the systems $2_1, 2_2, 2_3, \ldots, 2_n$ will conventionally incorporate a dedicated logic controller $4_1, 4_2, 4_3, \ldots, 4_n$ containing "custom business logic" for regulating the operations of that system. The custom business logic $4_1, 4_2, 4_3, \ldots, 4_n$ associated with each of the systems $2_1, 2_2, 2_3, \ldots, 2_n$ in turn communicates with the operator controls 3 for interfacing with the engineer operating the manufacturing line.

For typical manufacturing control systems of the type illustrated in FIG. 1, custom modifications to the controlling business logic are often difficult and at times even impossible to implement in view of the amount of time which is required to generate (or build) the necessary systems and to implement the systems which have been generated. When proprietary systems are involved, such modifications are not possible because the business logic is not accessible. Some desired business logic enhancements are made impossible to implement simply due to the structure of the main control system. Even in cases where customization is possible, the resulting changes can cause a significant and adverse impact on production.

Therefore, the primary object of the present invention is to provide a system which permits the business logic within a manufacturing control system to be modified without significantly impacting upon productive manufacturing time. Another object of the present invention is to overcome the inability to make rapid changes to the business logic across an entire manufacturing line within a manufacturing control system. Another object of the present invention is to overcome the lack of flexibility in customizing the business logic across the several areas of a manufacturing line within a manufacturing control system.

SUMMARY OF THE INVENTION

These and other objects which will become apparent are achieved in accordance with the present invention by providing the manufacturing control system with a custom business logic controller which can be used to define and implement custom business logic which departs from the conventional business logic associated with the several elements of the manufacturing control system both rapidly and in real time. As a result, such modifications can be implemented in such a way that there is no negative impact on production. Any new logic can be easily implemented, without requiring any direct changes to be made to the existing (current) systems.

The custom business logic controller of the present invention is implemented by defining desired business logic within the definitional environment of the controller. Where custom business logic is required, the manufacturing control system operates to activate the custom business logic controller, which then proceeds to execute the desired (custom) series of business logic units. Within this series, the custom business logic controller can execute a continuous series of business logic units, or certain business logic units can be executed conditionally, based on the success or failure of a prior business logic unit or units, or based on some other environmental condition.

The custom business logic controller of the present invention leads to a variety of benefits. For example, such a controller allows for real-time changes to business logic, leading to a rapid turn-around on solution implementation. It is even possible for a single controller to be used with many different manufacturing business practices and to interface with any required system. The flexibility of such a controller allows for solutions to problems both within the areas of a given manufacturing line, as well as across an entire line.

Such a controller can extend the usable lifetime of an existing system by allowing future problems to be resolved without requiring direct changes to the primary control system, and by providing for intelligence not originally available within the existing (unique) systems. Such a controller allows for the customization of business logic based upon factors or items that a particular manufacturing line deems important. Such a controller allows the primary control systems to remain consistent (free of business logic) and, therefore, remain usable across plural lines, while still allowing for the benefits of customization. Finally, such a controller enhances the ability of a production line to introduce new business practices while minimizing the negative impacts of doing so.

BRIEF DESCRIPTION OF THE DRAWING

The invention is best understood from the following detailed description when read in connection with the accompanying drawing. Included in the drawing are the following figures.

DETAILED DESCRIPTION OF PREFERRED EMBODIMENTS

Figure 1:
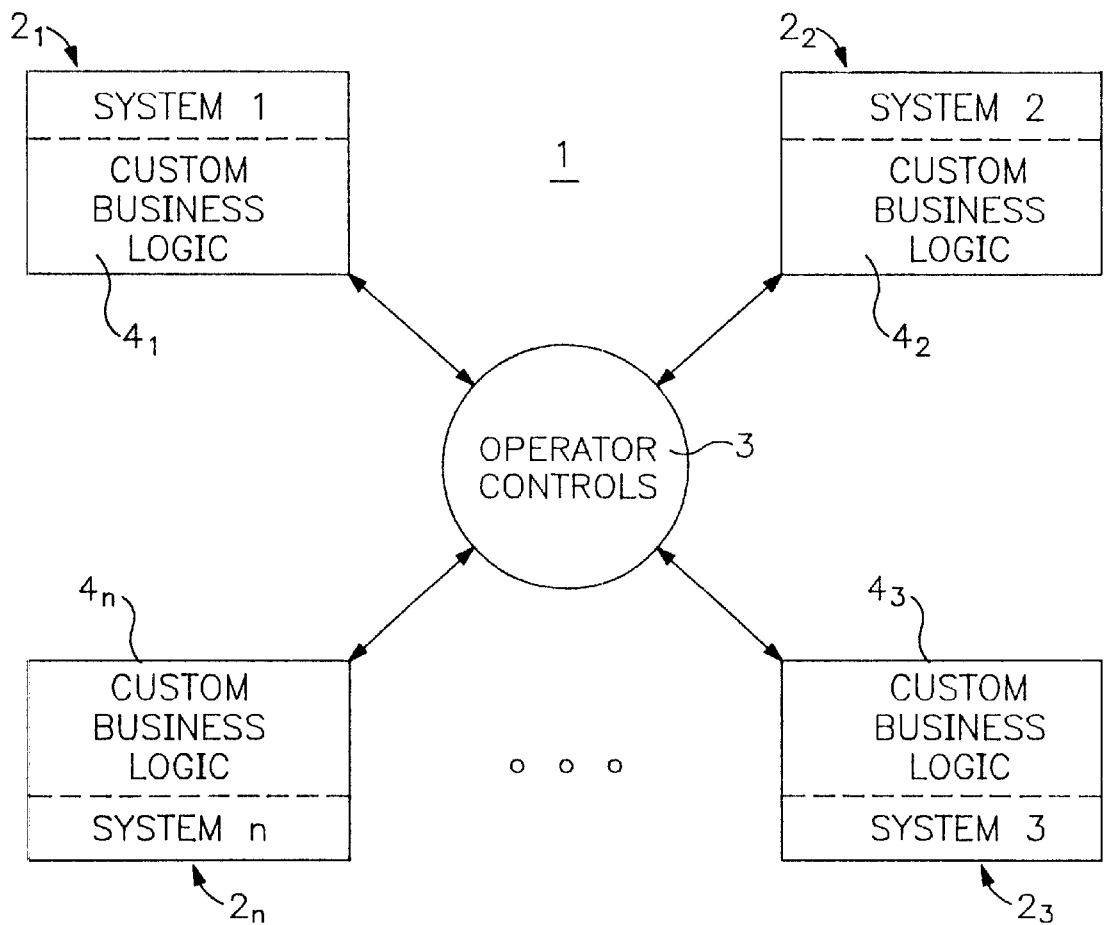
FIG. 1 is a schematic illustration of a prior art system for implementing a semiconductor manufacturing line.
Figure 2:
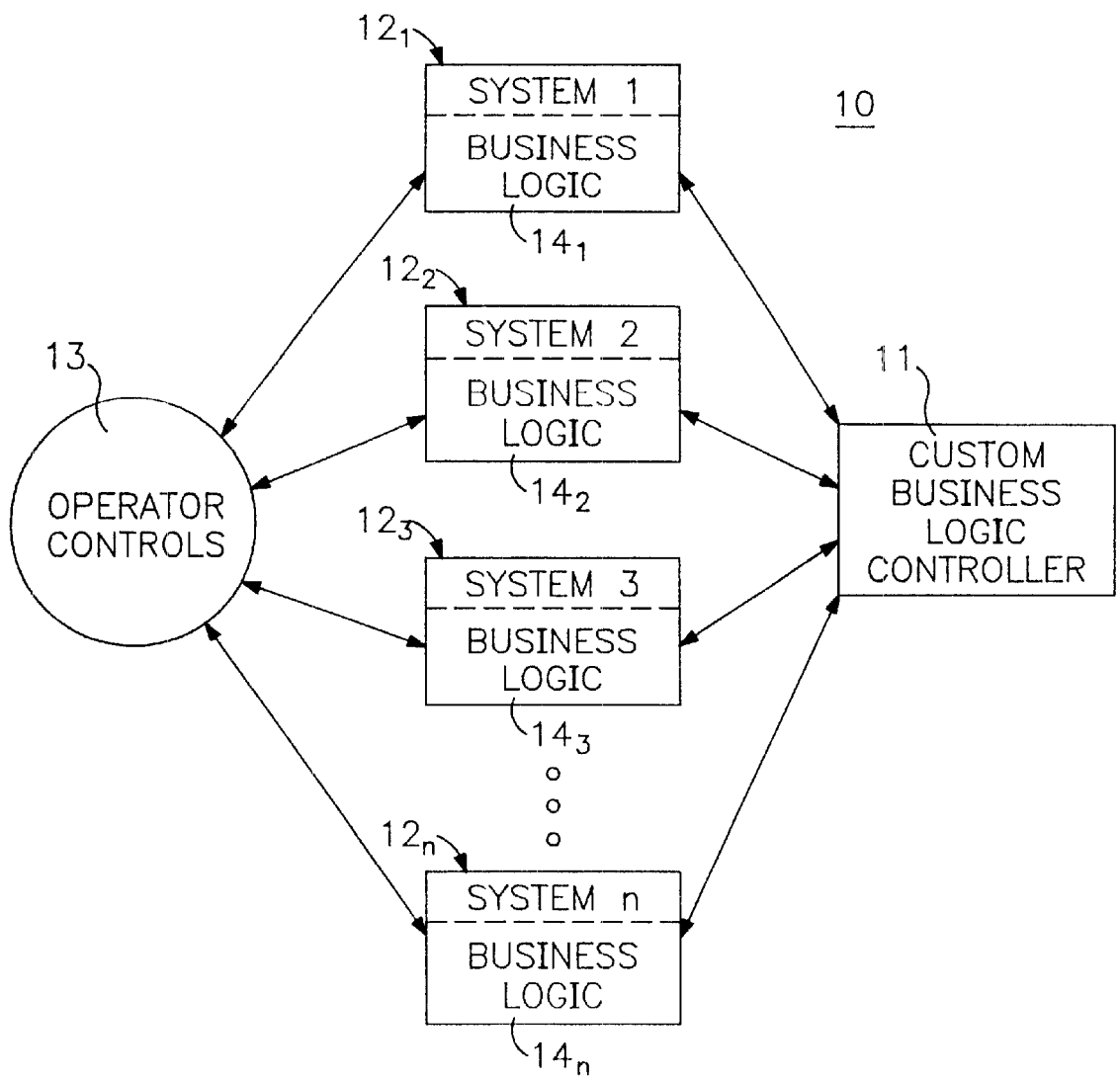
FIG. 2 is a schematic illustration of a system for implementing a semiconductor manufacturing line which uses the custom business logic controller of the present invention.

FIG. 2 shows an environment 10 for controlling the several processes associated with the theoretical manufacturing line shown in FIG. 1 using a custom business logic controller 11 produced in accordance with the present invention. As in the environment 1 of FIG. 1, the engineer operating the manufacturing line oversees each of a plurality of system elements $12_1, 12_2, 12_3, \ldots, 12_n$ using the operator controls 13. It will again be understood that the manufacturing line can comprise any number of, and any combination of, operating systems $12_1, 12_2, 12_3, \ldots, 12_n$ for performing a given manufacturing task. In the environment 10 of FIG. 2, however, and regardless of the configuration being implemented, the dedicated logic controllers $14_1, 14_2, 14_3, \ldots, 14_n$ (the business logic) associated with each of the systems $12_1, 12_2, 12_3, \ldots, 12_n$ now additionally communicates with the custom business logic controller 11 of the present invention.

The custom business logic controller 11 is generally implemented as an ordered list, or lists, of program events (or custom business logic units) that are returned to a program upon a request for a particular flow path. To this end, the controller 11 is coupled with the various systems $12_1, 12_2, 12_3, \ldots, 12_n$ which comprise the overall manufacturing control system so that the controller 11 can communicate with the several systems $12_1, 12_2, 12_3, \ldots, 12_n$ while remaining independent of any single control system. In this way, the controller 11 can be used by any or all of the systems $12_1, 12_2, 12_3, \ldots, 12_n$.

The distinct work flows developed within the controller 11 can be identified by desired (single or plural) key parameters. Such parameters can include an identifier for the system requesting a particular work flow (i.e., the calling system), as well as one or more sub-identifiers for the particular work flow that is being requested. It is critical for the ordered lists to be maintained within the controller 11 in a non-compiled manner to ensure that flow changes can be made as rapidly as possible without the need to recompile prior lists. It is also important that each individual event remain independent of all other events so that each event can be moved, removed, or modified without affecting any of the other events.

In its preferred implementation, a relational database is used to maintain distinct flows within the controller 11. Other internal mechanisms could also be implemented if desired. The communication mechanism between the controller 11 and the external systems $12_1, 12_2, 12_3, \ldots, 12_n$ associated with the controller 11 is preferably implemented using application programming interfaces (API's). Again, however, other standard programming mechanisms could be similarly used with an equivalent result.

Essentially, the custom business logic controller 11 of the present invention operates to remove all custom business logic from the plural systems $12_1, 12_2, 12_3, \ldots, 12_n$ which comprise the manufacturing control system to an external unit. The dedicated logic controllers $14_1, 14_2, 14_3, \ldots, 14_n$ associated with the systems $12_1, 12_2, 12_3, \ldots 12_n$ then need only be configured to communicate with the custom business logic controller 11, eliminating the need to modify dedicated system elements to meet changes in the manufacturing process. In this way, the custom business logic controller 11 alleviates many of the problems inherent in the traditional methods of customizing the particular control systems associated with a semiconductor manufacturing facility, thereby allowing a higher level of control to be implemented. Use of the controller 11 also helps to minimize the complexity of the several control systems associated with the manufacturing process, as well as the downtime typically required to implement customized changes.

By using the controller 11 of the present invention, custom business logic can be implemented without the need for modifications within any of the primary control systems. As a result, such systems are much more likely to remain portable to other areas of the manufacturing line, or possibly to other manufacturing lines. In terms of portability, the controller 11 can be used heavily to support differing requirements between the manner in which control systems are used in both developmental and manufacturing environments, thereby alleviating the need for two separate sets of control systems. Use of the controller 11 within some of the larger systems can at times offer the only realistic method of implementing certain custom business logic due to the inaccessibility to some programs, or simply due to the amount of work and the risk entailed in the traditional method of business logic modification.

Even in cases where the control system is available and capable of modification, doing so may result in future problems in which the custom code associated with a particular system must be reapplied in order to upgrade the control system from one version to the next. In addition, the serial nature of the custom business logic controller 11, which is preferred in accordance with the go present invention, assures that every operator controlling the manufacturing process, no matter how experienced, can be guided through the same sequence of events when a given function is invoked. This assurance reduces the risk that an impermissible process will occur while training new personnel.

The custom business logic controller 11 can be coupled with some or all of the control systems (i.e., the several systems $12_1, 12_2, 12_3, \ldots, 12_n$) associated with a given semiconductor manufacturing facility, and may be applied wherever customization of the system is or may at some point be required. This can include such areas as the initiation of system functions, as well as responses to system alarms, events, and problems. The controller 11 can be used to make the development and maintenance of control systems more efficient. By making higher levels of automation more practical, use of the controller 11 will help increase the real level of control that the system can exhibit over the product being manufactured, in this way minimizing the risk of product loss due to misprocessing.

To show how the custom business logic controller 11 of the present invention can be used to resolve system problems, several examples of typical problems found in a semiconductor manufacturing line will now be presented.

A first example illustrates how the custom business logic controller of the present invention can be used to resolve control problems associated with the primary tool set used in a photolithography process, including a resist track and a stepper control. This application will be discussed in terms of the tool automation program, or TAP, which is configured or customized to communicate with a specific type of tool. For informational purposes, the tool type will conventionally be identified by the name of the supplier and the model number of the part being manufactured.

In this example, and as is often the case, for every stepper there is an associated resist track and a physical integration module coupled with the two units to allow them to function as a single unit. In this configuration, although the two tools are designed to function as a single tool, there are certain conditions which make it desirable to operate the resist track and the stepper independently. As a result, there are two modes of operation that need to be considered for these tooling operations, including a stand-alone and an integrated mode.

Figure 3:
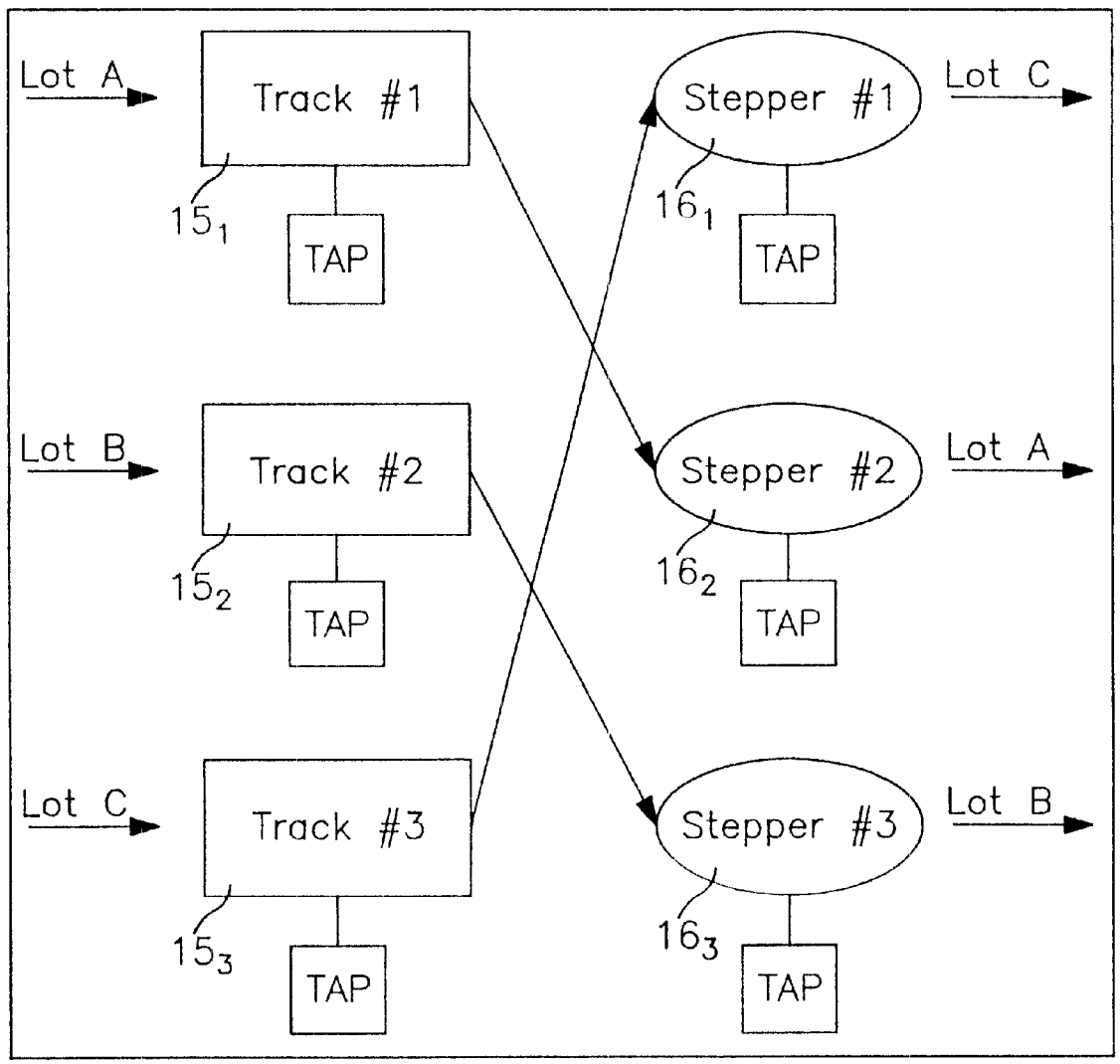
FIGS. 3 and 4 are schematic illustrations showing an example of how the custom business logic controller of the present invention can be used to facilitate operations of the primary tool set used in a photolithography process.
Figure 4:
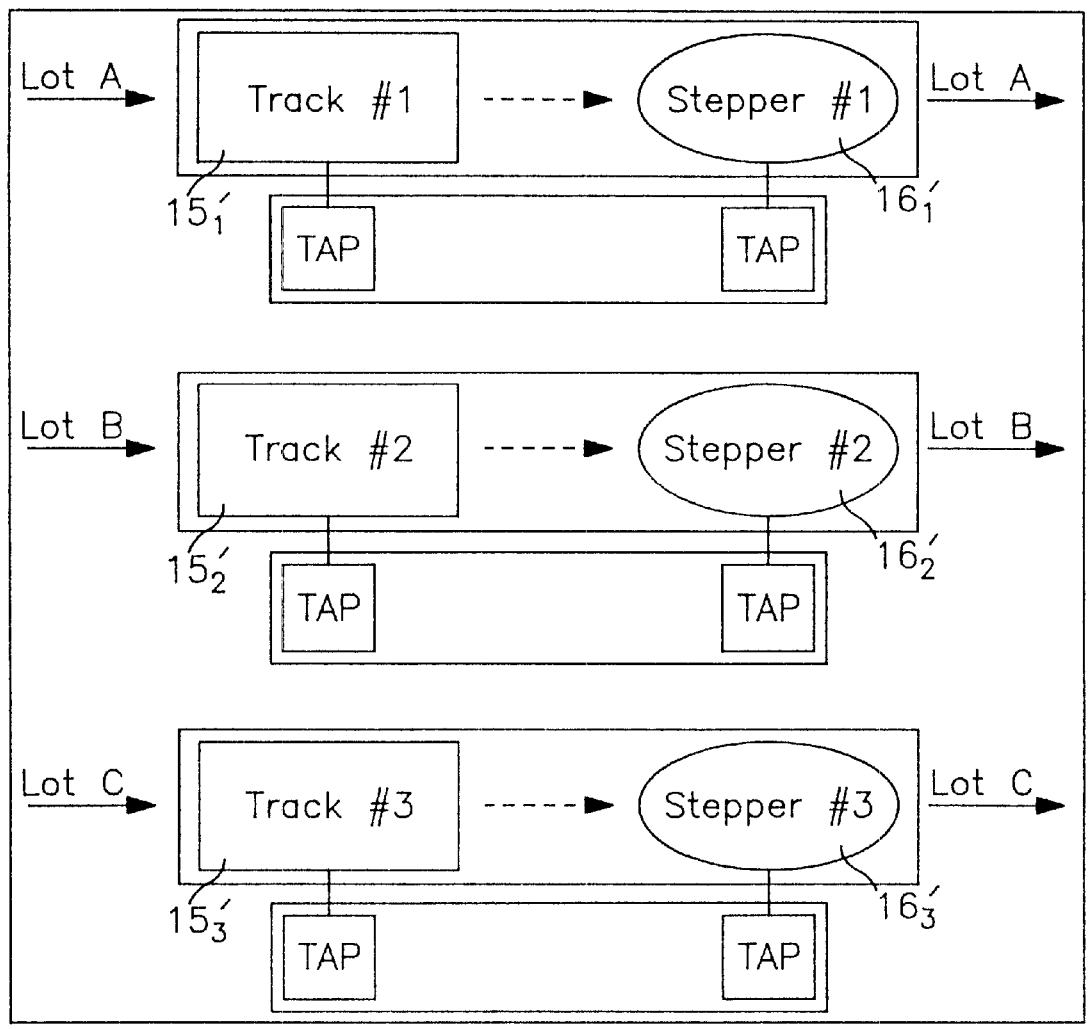

In the stand-alone mode, and referring to FIG. 3 of the drawing, the resist tracks $15_1$, $15_2$, and $15_3$ and the steppers $16_1$, $16_2$, and $16_3$ are executed as fully independent tools so that any product (e.g., Lot A, Lot B or Lot C) which is coated on any given resist track $15_1$, $15_2$, or $15_3$ can be exposed on any given stepper $16_1$, $16_2$, or $16_3$. In the integrated mode, and referring now to FIG. 4, the resist tracks $15_1'$, $15_2'$, and $15_3'$ and the steppers $16_1'$, $16_2'$, and $16_3'$ are executed as a single tool so that any product (the Lot A, the Lot B, or the Lot C) which is coated on a given resist track $15_1'$, $15_2'$, or $15_3'$ must continue through the process, to be exposed on the corresponding stepper $16_1'$, $16_2'$, $16_3'$. For example, any product that is coated on the track $15_1'$ in FIG. 4 will be exposed on the corresponding stepper $16_1'$, and so on.

To best complete this example, a simplified flow for several exemplary TAP processes, which are likely to vary based on the mode of operation used, will now be reviewed. As shown in Table 1, a simplified flow of items for which the resist track TAP is responsible when the tool is run in a stand-alone mode are listed in the order that they would be performed. This table shows that the resist track TAP need only handle issues with respect to the resist track when operating in the stand-alone mode. Likewise, a similar statement can be made concerning the flow within the stepper track TAP when in the stand-alone mode, as shown in Table 2.

TABLE 1

Resist Track TAP Flow
(Stand-alone Mode)

| Order | Description |
|---|---|
| 1 | Ensure resist track is available to run |
| 2 | Download resist track recipe to track |
| 3 | Ensure resist and other chemicals are available for run |
| 4 | Start resist track run |

TABLE 2

Stepper TAP Flow
(Stand-alone Mode)

| Order | Description |
|---|---|
| 1 | Ensure stepper is available to run |
| 2 | Ensure reticle is available |
| 3 | Download stepper recipe |
| 4 | Start stepper run |

When the tools are run in the integrated mode of operation, however, it becomes imperative for the product to be able to run continuously through both the resist track and the steppers. To permit this, at least some amount of critical stepper-related information is required by the resist track TAP before the system can allow any product to begin being processed (on the resist track). It is also important for the stepper TAP to be notified that it is being operated in an integrated mode, to prevent an attempt at starting the stepper TAP in a stand-alone mode until after the product that was started in the integrated mode has completed its run. Table 3 gives one example of how the resist track TAP can operate to initiate production in an integrated mode.

TABLE 3

Resist Track TAP Flow
(Integrated Mode)

| Order | Description |
|---|---|
| 1 | Ensure resist track is available to run |
| 2 | Ensure stepper is available to run |
| 3 | Ensure reticle is available |
| 4 | Download process recipe to track |
| 5 | Ensure resist and other chemicals are available for run |
| 6 | Reserve stepper for integrated run |
| 7 | Start resist track run |

In practice, the necessary "system calls" for implementing such flows can be arranged and compiled into the TAP programs associated with the various tools of a particular system. This traditional approach can lead, however, to extremely large and complex programs that are difficult to maintain and highly customized to the exact configuration of the tools of the system. The custom business logic controller of the present invention can in such case be used to provide significant improvements over the traditional approach. These improvements become apparent when the logic flow within a resist track TAP which has been modified to utilize the custom business logic controller is compared with the logic flow when the traditional approach is used. As shown in Table 4, use of the custom business logic controller allows the flow to be simplified to that point where the operative tool would first identify the mode of operation, then request the custom flow for the mode of operation from the controller, and finally continue to execute the returned flow.

TABLE 4

Resist Track TAP Flow
Using Custom Business Logic Controller

| Order | Description |
|---|---|
| 1 | Identify Mode of Operation |
| 2 | Request Mode-Specific Flow From Controller |
| 3 | Execute Flow Returned from Controller |

In this manner, if the mode of operation is stand-alone, the custom business logic controller returns the processing flow described in Table 1 to the resist track TAP when the request for the mode-specific flow is made. Similarly, the processing flow described in Table 3 would be returned to the resist track TAP when the mode of operation is integrated.

This example shows that, while the resultant process flow is identical in either case, the control system program logic (in this case the TAP program) is kept much simpler by using the custom business logic controller because both operating modes are handled identically from its perspective. In addition, once the custom business logic controller is integrated into the tool automation program, future changes to existing process flows (i.e., changes to the business logic), or new modes of operation, can be accommodated through relatively simple changes made within the controller and without requiring any programming changes or associated down time for the TAP program. Moreover, because the custom business logic is maintained outside of the TAP program, the potential for portability of the TAP program is made much higher than in the traditional case, where the custom logic is written as an integral part of the TAP program. Finally, and most important, the greatly simplified manner in which the custom business logic is implemented permits implementation of logic flows, which would not previously have been possible using the traditional approach (e.g., due to issues of complexity and cost), using the custom business logic controller. The result is reduced risk of product re-work and scrap due to misprocessing.

A second example illustrating how the custom business logic controller of the present invention can be used to resolve control problems is given for the case where a single type of process tool is used in multiple areas of a given manufacturing line. Such a condition occurs frequently in typical semiconductor manufacturing lines. This example will be discussed in the context of a high-temperature furnace which can be configured to support multiple types of semiconductor manufacturing processes.

For such applications, the responsibility for defining and maintaining the tool processes often falls on multiple persons and, in many cases, on multiple engineering organizations. As a result of this separation of responsibility, as well as the varying requirements of the processes themselves, the tools are often run differently, based primarily on whatever process is being run. As was the case for the photolithography tools discussed in the first example, each of the furnaces will be controlled by a tool automation program (TAP) which is uniquely identified (e.g., by the vendor name and model number). To simplify the discussion which follows, it will be assumed that the tool type and, therefore, the TAP program is the same for all furnaces.

Figure 5:
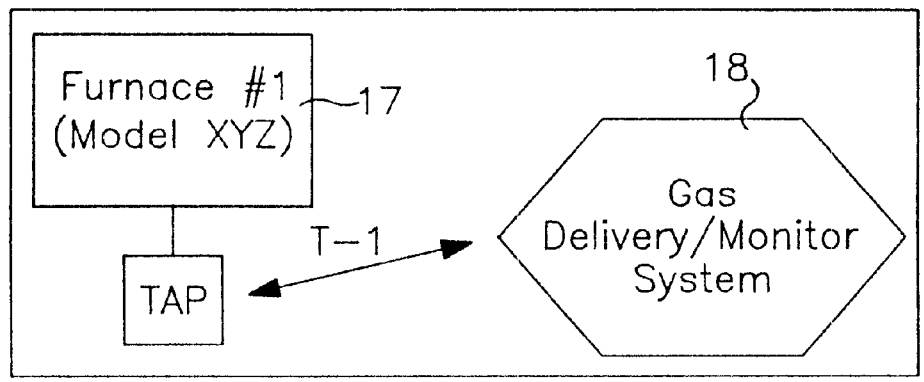
FIGS. 5 and 6 are schematic illustrations showing an example of how the custom business logic controller of the present invention can be used to facilitate operations in which a single type of process tool is used in multiple areas of a manufacturing line.

The desired situation for operating one such furnace (the furnace 17) is shown with reference to FIG. 5 of the drawing. In practice, it is known that furnace processing operations (runs) can often be extensive in duration. As a result, a typical concern before starting a furnace process run is whether or not a sufficient quantity of the required gases is present in the supply line to support a complete run. Responsive to this concern, it is likely that the engineer responsible for a given furnace would request that a check (T-1) be made to ensure that the required gases are in adequate supply before the TAP program starts the run of a given product lot on the tool. In this example, such gas supply levels are obtained from a gas delivery and monitoring system 18.

Figure 6:
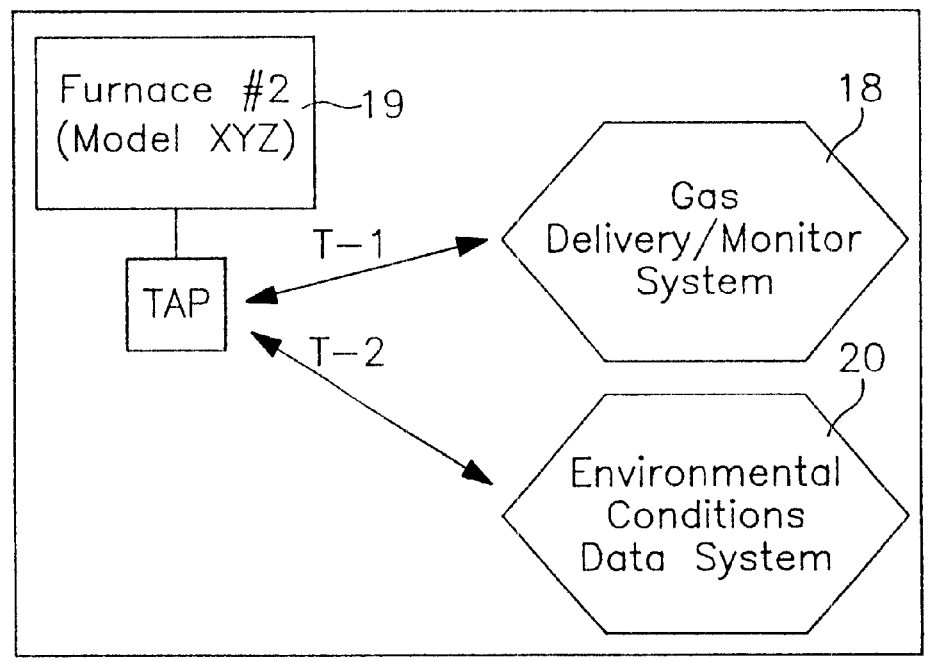

Referring to FIG. 6 of the drawing, let it now be assumed that there is a second furnace (the furnace 19) which is of the same tool type as the furnace 17, yet which is running a different process, supported by a different engineer. In such cases, it is known that there are one or more environmental conditions (e.g., such as barometric pressure) that can result in process instabilities. As a result, the engineer responsible for the furnace 19 will ordinarily request that an additional check (T-2) be made to ensure that such environmental conditions are within their allowable limits before any product can be started in the furnace 19. In this example, such environmental conditions are obtained from an environmental conditions data system 20. The engineer will also want to consider the results of the check (T-1) made by the first engineer (of the gas delivery and monitoring system 18) so that this information is included in the settings for the furnace 19 as well.

As in the first example, the conventional practice for ensuring that the operational requirements (i.e., the requests) of the furnaces 17, 19 are satisfied is to customize the furnace TAP program. In the present example, these modifications would have to be such that the "calls" to the gas delivery and monitoring system 18 would be made and acted upon for both of the furnaces 17, 19, while calls to the environmental conditions data system 20 would only be made and acted upon for the furnace 19.

The same problems that were identified with the traditional approach for handling the process described in the first example can also be found in the present example. Even if possible, the traditional approach would tend to lead to large, complicated programs which are difficult and expensive to maintain, and which are so highly customized that they would rarely be portable. Moreover, due to the high level of complexity associated with the implementation of custom logic using a traditional approach, the desired controls cannot be reasonably implemented. This results, in turn, in additional product re-working and scrap.

Such problems (with the traditional approach) are avoided by implementing the custom business logic controller of the present invention within the furnace TAP program. This implementation would preferably involve a tool-specific request made to the controller, which would then return the applicable process flow to the TAP program. The TAP program would then continue to execute the remaining work flow. If the TAP for furnace 17 were making the request, the returned information would only include a check of the gas delivery and monitoring system 18. If the TAP for furnace 19 were making the request, however, the returned information would then include a check of the gas delivery and monitoring system 18 as well as a check of the environmental conditions data system 20, yielding the results previously discussed as desirable for such an application.

A third example illustrating how the custom business logic controller of the present invention can be used to resolve control problems is given for the case where multiple control systems (e.g., associated with multiple types of process tools) are used in multiple areas of a given manufacturing line. Again, this is a condition that occurs frequently in typical semiconductor manufacturing lines. The example is discussed in the context of a high-temperature furnace which can be configured to support multiple types of semiconductor manufacturing processes.

Figure 7:
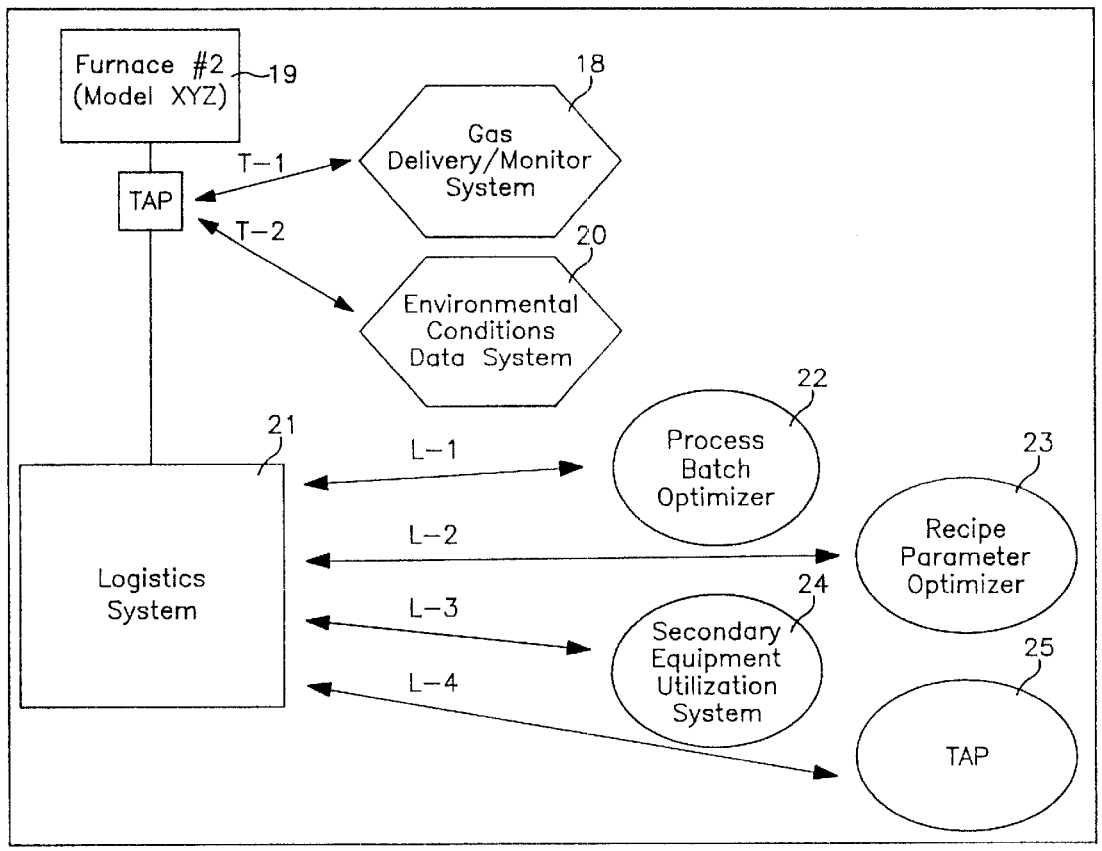
FIG. 7 is a schematic illustration showing an example of how the custom business logic controller of the present invention can be used to facilitate operations in which multiple control systems are used in multiple areas of a manufacturing line.

FIG. 7 shows an expanded configuration for the previously described control systems associated with the furnace 19. In this example, a logistics system 21 is responsible for the movement of product within the manufacturing line, and is shown together with a sequence of system functions that might typically be invoked before the movement of any product lots into the furnace 19 (for the given logistics system 21). In this example, the sequence of events that occurs before the initiation of any processing in the furnace 19 (with respect to the logistics system 21) includes an optimization of the process batch to maximize productivity, at 22, followed by an optimization of the recipe process parameters based on historical trends, at 23. This is followed, in turn, by appropriate change of the equipment status for the furnace 19 in a secondary equipment utilization tracking system, at 24, and finally, by the initiation of product in the furnace TAP, at 25.

As with the TAP programs in the previously given examples, the logistics system 21 of the present example could theoretically be implemented using the conventional approach to automate the flow of events by the customization of its program (e.g., to make the calls to the external systems 22, 23, 24, and 25 shown in FIG. 7). More often than not, however, the program code for the logistics system 21 is either not available for modification, due to its proprietary nature, or is so large and complex that the task of customizing the program code for a single tool would be impractical. In either case, the controlled sequencing of the events sought to be implemented is not possible and the sequence would be left to the operator and to the procedural discipline to pursue manually, with the result that the desired control must be taken out of the control system. On the other hand, if customization of the logistics program code is possible, the previously mentioned problems associated with the attempted implementation of such a system using a conventional approach would again apply.

As in the first and second examples, however, the custom business logic controller of the present invention can be used to alleviate the problems associated with the conventional implementation of custom business logic. In such case, the logistics system 21 would make a call to the controller to request the flow for the furnace 19. The controller would then return the flow to the logistics system 21, for execution as previously described. When the logistics system 21 reaches the end of the flow, and calls the furnace TAP to initiate physical processing of the product, the TAP program would begin by requesting the flow for the furnace 19 from the controller and then continue with the appropriate custom processing as defined by the controller.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. The present invention can further be embodied in the form of computer-implemented processes and apparatus for practicing such processes, for example, and can be embodied in the form of computer program code embodied in tangible media, such as floppy diskettes, fixed (hard) drives, CD ROM's, magnetic tape, fixed/integrated circuit devices, or any other computer-readable storage medium, such that when the computer program code is loaded into and executed by a computer, the computer becomes an apparatus for practicing the invention.

What is claimed:

1. A program storage device readable by a machine, tangibly embodying a program of instructions executable by the machine to perform the method steps for controlling a manufacturing process performed by a plurality of system elements, wherein at least one of the system elements includes a system controller containing business logic which determines a sequence of operations of the at least one system element which are performed according to a defined recipe for performing the sequence of operations determined by the business-logic, and wherein an operator control device communicates with the system controller of the at least one system element, said method steps comprising:

coupling a custom business logic controller with the system controller, wherein the custom business logic controller contains custom business logic which determines a custom sequence of operations which differs from the sequence of operations determined by the business logic which is contained in the system controller and wherein the sequence of operations of the at least one system element determined by the custom business logic differs from the sequence of operations of the at least one system element determined by the business logic contained in the system controller;

communicating the custom business logic from the custom business logic controller to the system controller; and changing operations of the at least one system element responsive to the custom business logic communicated from the custom business logic controller.

2. The program storage device of claim 1 wherein the method further includes the step of determining the operations of the system elements which perform the manufacturing process using the custom business logic.

3. The program storage device of claim 1 wherein the method further includes the step of performing the manufacturing process according to the operations which are determined by the custom business logic, as defined by the recipe.

4. The program storage device of claim 2 wherein the method further includes the step of defining the operations of the system elements which perform the manufacturing process determined by the custom business logic according to the recipe.

5. The program storage device of claim 4 wherein the recipe defining the operations performed by the business logic corresponds to the recipe defining the operations performed by the custom business logic.

6. The program storage device of claim 4 wherein the recipe defining the operations performed by the business logic differs from the recipe defining the operations performed by the custom business logic.

* * * * *